United States Patent [19]

Foote

[11] E Re. 29,001

[45] Reissued Oct. 12, 1976

[54] CIGARETTE SNUFFING DEVICE FOR VEHICLES

[76] Inventor: Milton Foote, 831 S. Water St., Silverton, Oreg. 97381

[22] Filed: Mar. 6, 1975

[21] Appl. No.: 556,133

Related U.S. Patent Documents

Reissue of:

[64] Patent No.: 3,782,394
Issued: Jan. 1, 1974
Appl. No.: 249,188
Filed: May 1, 1972

[52] U.S. Cl. ..... 131/256; 131/235 ST
[51] Int. Cl.[2] ..... A24F 13/18
[58] Field of Search ..... 131/256, 235 R, 235 ST, 131/237

[56] References Cited

UNITED STATES PATENTS

| | | | |
|---|---|---|---|
| 1,759,925 | 5/1930 | Van Gelderen | 131/237 |
| 2,639,718 | 5/1953 | Leong | 131/256 |
| 2,768,631 | 10/1956 | Russell | 131/235 R |
| 2,942,608 | 6/1960 | Allman | 131/256 |
| 3,375,832 | 4/1968 | McMichael | 131/235 R |

*Primary Examiner*—Hugh R. Chamblee
*Assistant Examiner*—John F. Pitrelli
*Attorney, Agent, or Firm*—Oliver D. Olson

[57] ABSTRACT

A device for installation in automotive vehicles for safely snuffing out cigarettes. The device primarily includes a base fitting in which is carried an expandable split tube which is tapered at its lower extremity in order to snuff out a cigarette completely, prior to the placing or urging it into an ashtray.

2 Claims, 4 Drawing Figures

CIGARETTE SNUFFING DEVICE FOR VEHICLES

Matter enclosed in heavy brackets [ ] appears in the original patent but forms no part of this reissue specification; matter printed in italics indicates the additions made by reissue.

This invention relates to cigarette snuffing devices, and more particularly to a cigarette snuffing device for automotive vehicles.

It is therefore the primary purpose of this invention to provide a snuffing device which will be of such structure so as to be installed on top of the dashboard of the vehicle in order that the smoker may snuff out the cigarette safely without taking his eyes off of the road.

Another object of this invention is to provide a cigarette snuffing device of the type described which has an expandable split tube which is tapered at its lower extremity and is received within an externally threaded sleeve which may extend below the dashboard of the vehicle by means of a fitting which is secured thereto by suitable nut fastner means.

A further object of this invention is to provide a device of the type described in which the upper extremity includes a concave portion for guiding the cigarette butt into the device in order that it may be pushed down into the tapered and split tube for it to be snuffed out and the device will retain the snuffed out cigarette until another cigarette is urged into the device on top of the snuffed out cigarette.

A still further object of this invention is to provide a device of the type described which has a rubber O-shaped ring carried within a groove in the outer periphery of the upper extremity of the split tube, the rubber ring normally urging the split portions of the tube together while expanding sufficiently to enable the butt to be pushed into the tube to be snuffed out.

Other objects of the present invention are to provide a cigarette snuffing device for vehicles which is simple in design, inexpensive to manufacture, rugged in construction, easy to use and efficient in operation.

These and other objects will be readily evident upon a study of the following drawing and the accompanying drawing, wherein.

Figure 1:
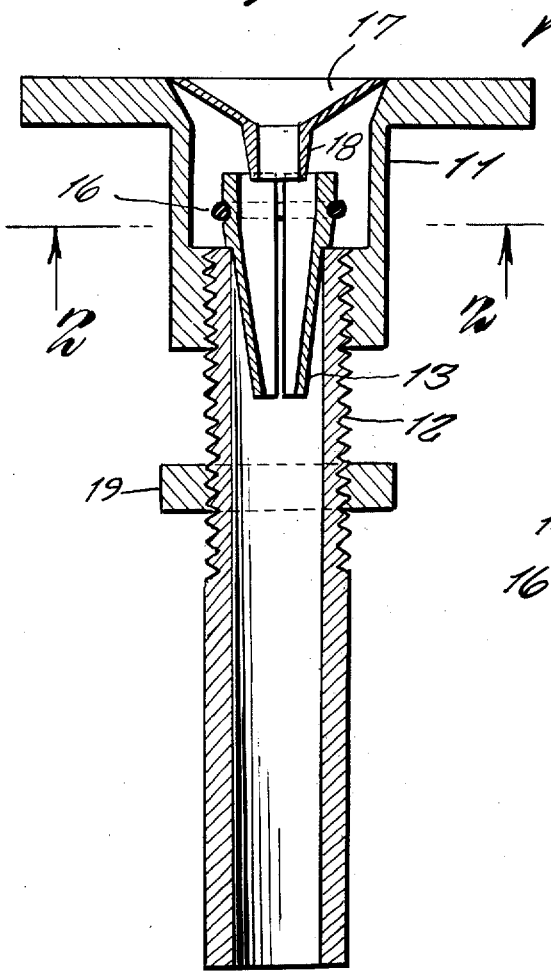
FIG. 1 is a vertical cross sectional view of the present invention.
Figure 3:
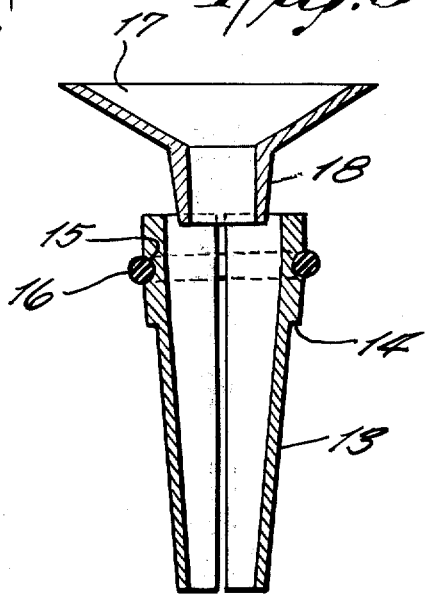
FIG. 3 is an enlarged vertical cross sectional view of the split tube and concave member, shown assembled and removed from the device of FIG. 1 for the sake of clarity.
Figure 4:
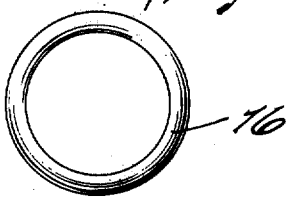
FIG. 4 is an enlarged plan view of the O-ring shown removed from FIG. 3.
Figure 2:
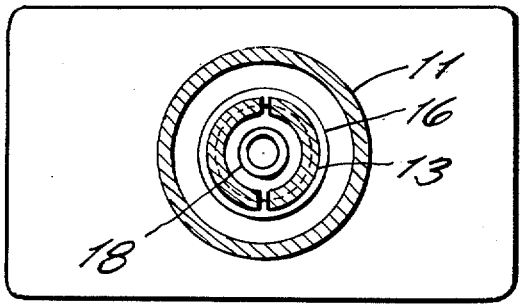
FIG. 2 is a cross sectional view taken along the line 2—2 of FIG. 1.

According to this invention, a cigarette snuffing device 10 is shown to include a fitting 11 for mounting the device 10 within a vehicle's dashboard (not shown) and secured therein by a conventional lock nut 19 threadingly engaged around a threaded sleeve 12. The externally threaded sleeve 12 receives the expandable split tube 13, the tube 13 having a shoulder portion 14 for resting against the upper extremity of the sleeve 12 which is threadably received within fitting 11. A groove 15 in the upper extremity of the split tube 13 carries the O-ring 16 which is of rubber so as to be expandable for the preferred operation of the device 10.

The concave member 17 includes an extension 18 for being received in the upper portion of split tube 13, the concave member 17 enabling the smoker to guide the cigarette butt easily into device 10 in order that it may be safely snuffed out. After the cigarette butt is placed into the split tube 13 the inner bore defined by the two halves of the tube 13 will frictionally engage and retain the cigarette butt so that it will be completely snuffed out in a minimum of time and will thus be retained therein by the elasticity of the O-ring 16.

When another cigarette butt is to be extinguished it is placed into device 10 on top of the butt retained within the tube 13 and when the second butt is urged downward, it will thus expand the tube 13 and discharge the first or previous cigarette butt into an ash receptacle.

What I claim is:

1. A snuffing device adapted for use in automotive vehicles comprising means for mounting said device upon a horizontal surface of a dashboard, said device including a vertically disposed tapered and split tube adapted to receive a cigarette butt to be snuffed therein, an O-ring carried by the upper portion of said tube adapted to resiliently resist expansion of the split elements of the tube whereby a butt may be retained therein and discharged downwardly therefrom after being snuffed, said mounting means including a centrally apertured concave guide means having a discharge tubular part extending downwardly into the upper portion of said split tube, and a tubular portion surrounding said guide and discharge tubular part and having an internally threaded portion at the lower end thereof, and a vertically disposed elongated sleeve having external threads at the upper end thereof adapted to engage the internal threads of said tubular portion, the sleeve having a planar upper end and a lock nut thereon adapted to engage the lower end of said tubular portion, said split tube having a downwardly directed shoulder located below said O-ring and spaced slightly therefrom, whereby placing a butt downwardly in said device will cause said split tube element to pivot about said shoulder against the resistance of said O-ring thereby causing the snuffing of said butt and whereby the placing of a succeeding butt therein in a like manner will cause the first to be discharged downwardly therefrom, and also the snuffing of said succeeding butt.

*2. A snuffing device comprising a hollow mounting member, a tapered and split tube adapted to receive a cigarette butt to be snuffed therein, an outwardly projecting shoulder intermediate the ends of the split tube, the hollow mounting member receiving the split tube and supporting the latter by said shoulder in a substantially vertical position, resilient means engaging the split tube for resiliently resisting expansion of the lower portion of the split elements of the tube, whereby a butt may be retained therein and discharged downwardly therefrom after being snuffed, a concave guide member mounted above the split tube and having a central aperture registering with the upper end of said split tube, whereby inserting a butt downwardly through said central aperture and into the split tube will cause the split tube elements to expand against the resilient resistance of said resilient means, thereby causing the snuffing of said butt and whereby the insertion of a succeeding butt therein in a like manner will cause the first butt to be discharged downwardly therefrom and also the snuffing of said succeeding butt.*

* * * * *